United States Patent Office 3,652,572
Patented Mar. 28, 1972

---

3,652,572
PROCESS FOR THE PRODUCTION OF 2,6-DI-CYANOTRICHLOROPYRIDINE FROM A 2,6-DI-CYANOPIPERIDINE COMPOUND
Thomas A. Magee, Mentor, Ohio, assignor to Diamond Shamrock Corporation, Cleveland, Ohio
No Drawing. Filed Apr. 6, 1970, Ser. No. 26,141
Int. Cl. C07d 31/46
U.S. Cl. 260—294.9
9 Claims

ABSTRACT OF THE DISCLOSURE

A two-stage process is described for preparing 2,6-dicyanotrichloropyridine which consists essentially of reacting, in the first stage, a 2,6-dicyanopiperidine compound having the structural formula

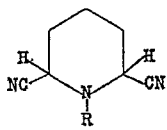

wherein R=H or $C_{1-5}$ alkyl, with chlorine at a temperature of 20°–80° C. with the aid of ultraviolet radiation to effect substantial dehydrogenation together with aromatization and perchlorination of at least a portion of the original dicyanopiperidine material; thereafter reacting the resulting partly chlorinated product mass with chlorine, preferably in the vapor phase at a reaction temperature of 150–500° C., to obtain 2,6-dicyanotrichloropyridine of high purity in at least 50 percent yield. The compound produced by the claimed process is an important industrial biocidal agent. It is known to exhibit fungicidal, pesticidal and herbicidal activity.

BACKGROUND OF THE INVENTION

This invention relates to an economical method for preparing 2,6-dicyanotrichloropyridine, a compound particularly useful as an industrial biocide. More particularly, it relates to a method for chlorinating certain 2,6-dicyanopiperidines whereby high purity 2,6 - dicyanotrichloropyridine is obtained in commercially acceptable yields.

In U.S. Pat. No. 3,325,503, there is described a method for reacting a non-chlorinated pyridine compound, e.g., 2,6-dicyanopyridine, with chlorine in the vapor phase, in the presence of a solid catalyst and at a temperature of 200°–500° C. This method provides the desired 2,6-dicyanotrichloropyridine product in shorter reaction times and in greater yields than could be obtained with earlier methods.

However, the 2,6-dicyanopyridine intermediate employed is, in itself, quite expensive, being obtained typically in low yields and only with difficulty by the ammoxidation of 2,6-lutidine as described in Chemical Engineering Progress, September 1964, pages 48–49. Another method reported in this same reference for preparing the dicyanopyridine intermediate is also expensive and time-consuming. It involves many successive reactions to convert the dimethylpyridine starting material initially to pyridine 2,6-dicarboxylic acid, then to the amide derivative of the acid and finally of the desired product by dehydration of the amide. Accordingly, presently available methods for preparing 2,6-dicyanotrichloropyridine in sufficient quantities for large scale application are not economical and commercially feasible.

SUMMARY OF THE INVENTION

It is an object of this invention, therefore, to provide a more efficient, less expensive method for preparing 2,6-dicyanotrichloropyridine on a commercial scale.

It is another object of this invention to provide a more efficient method for preparing the desired dicyanotrichloropyridine product by employing a more easily obtained, less expensive intermediate than 2,6-dicyanopyridine.

These and other objects will become apparent to those skilled in the art by a description of the invention which follows.

DESCRIPTION OF THE PREFERRED EMBODIMENTS

In general, the present invention comprises chlorinating a cycloaliphatic nitrogen compound, such as 2,6-dicyanopiperidine or an N-alkyl 2,6-dicyanopiperidine to dehydrogenate, aromatize and perchlorinate it to produce the desired dicyanotrichloropyridine product. The order in which the said dehydrogenation, aromatization and perchlorination occur has not been established.

In practice, the chlorination reaction is conducted first at low temperatures, e.g., 20–80° C., in the presence of ultraviolet radiation for a sufficient time to effect substantial chlorination of the dicyanopiperidine moiety at which point at least some of the material has been aromatized as indicated by the presence of some of the desired dicyanoperchloropyridine product. Thereafter, for improved yield of the desired product, the chlorination reaction is then continued at elevated temperatures for a sufficient period of time to obtain 2,6-dicyanotrichloropyridine of high purity in at least 50 percent of theoretical yield.

The 2,6-dicyanopiperidine compounds chlorinated in the process are known compounds which conform to the general structure:

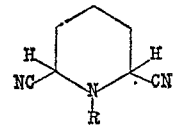

wherein R=H or $C_{1-5}$ alkyl.

Of these compounds, a 2,6-dicyanopiperidine wherein R=H may be prepared from glutaraldehyde according to the procedure outlined in U.S. Pat. No. 3,147,267, namely, by reacting glutaraldehyde with hydrogen cyanide (HCN) and then reacting the glutaraldehyde dicyanohydrin thus obtained with ammonia under slightly alkaline conditions at a temperature of −20° to 150° C. A piperidine compound wherein R=a $C_{1-5}$ alkyl, i.e., a methyl, ethyl, propyl, butyl or amyl radical, is prepared by reacting glutaraldehyde dicyanohydrin with a primary alkylamine according to the procedure outlined in the Journal of Organic Chemistry, vol. 27, pages 1298–1301.

Being known compounds, the foregoing described 2,6-dicyanopiperidine compounds per se do not constitute a part of the present invention, nor does any particular method as set forth hereinabove for their preparation.

As previously described, the chlorination reaction is initially conducted at low temperatures, i.e., within the range of 20°–80° C., with the aid of ultraviolet radiation. Within this temperature range, chlorination causes conversion of at least a portion of the amine, i.e., the 2,6-dicyanopiperidine compound, to the desired perchlorinated 2,6-dicyanopyridine. This chlorination reaction is typically carried out in a suitable organic liquid which is essentially a solvent for the 2,6-dicyanotrichloropyridine product, e.g., trichlorobenzene, chloroform, carbon tetrachloride or tetrachloroethane.

Prior to the initial chlorination, however, it may be advantageous in many instances to convert the particular 2,6-dicyanopiperidine starting material to its hydrochloride salt, effected simply and rapidly by adding hydrogen chloride (HCl) to a solution of the amine in any suitable solvent which may be the same as that employed in the subsequent chlorination step. The HCl is added at least to saturation, and during the addition, the amine solution is controlled at a maximum temperature of about 20° C., since the HCl-amine reaction is of a strong acid-base type and is very exothermic. By employing this procedure and then chlorinating its hydrochloride salt rather than the 2,6-dicyanopiperidine compound itself, much of the problems of temperature control reported to be involved in the chlorination of aliphatic or cycloaliphatic amines can be obviated. Additionally, the total chlorination time can be shortened considerably since chlorine can be added to the 2,6-dicyanopiperidine hydrochloride salt at an accelerated rate right from the beginning, with no concurrent sharp rise in reaction temperature.

Further chlorination of the incompletely chlorinated product from the initial photochlorination is carried out at elevated temperatures, e.g., within the range of 150°–500° C., to recover 2,6-dicyanotrichloropyridine. In general, any presently known high-temperature chlorination method may be employed. From this procedure, the product is obtained in most instances in at least 50% yield.

In the presently preferred embodiments herein, however, the later-stage chlorination is carried out substantially as described in U.S. Pat. No. 3,325,503, which disclosure is incorporated herein by reference. Briefly, this method involves reacting the photochlorinated product mass with chlorine in the vapor phase, in the presence of a suitable solid catalyst and at a temperature of 200°–500° C. In this manner, perchlorination of the initial, only partly chlorinated reaction mixture is completed substantially and the desired perchlorinated dicyanopyridine compound is recovered in the best commercially-feasible yields, i.e., typically much greater than 50% of theoretical.

As recovered, the 2,6-dicyanotrichloropyridine product is comparatively pure as evidenced by vapor phase chromatographic analysis (VPC). It can be further purified by one or more recrystallizations from a suitable solvent as chloroform, carbon tetrachloride, benzene, or the like. The final product is a white crystalline solid melting at 200°–202° C. The identity of this compound is confirmed by a mixed melting point determined with an authentic sample of 2,6-dicyanotrichloropyridine prepared by the process of U.S. Pat. No. 3,325,503 and further by the identity of the infrared spectrum of the product with the infrared spectrum of the authentic sample.

In U.S. Pat. Nos. 3,251,760 and 3,389,069, issued May 17, 1966 and June 18, 1968, respectively, there is described a two-step process for the chlorination of aliphatic tertiary amines to produce compounds having an N=CCl-radical. The aliphatic tertiary amines whose chlorination is described may be either linear or cyclic in structure. As would be expected, no fundamental differences were found in the products resulting from chlorination of the cyclic amines compared to those from the linear amines, with the exception that the cyclic compounds, in several instances, were converted to their aromatic analogs in consequential reactions.

Among the compounds whose chlorination is disclosed in the aforesaid patents is dimethylaminoacetonitrile. Chlorination of this compound causes splitting off of the nitrile group from the molecule in the form of cyanogen chloride with the resulting product being a dimeric derivative, $Cl_2C=N-CCl_2CCl_2-N=CCl_2$.

In the process of the present invention, there is chlorinated a compound, namely N-methyl-2,6-dicyanopiperidine, wherein the nitrile group and the N-methyl group are in the same relationship to the amine nitrogen and to each other as found in the dimethylaminoacetonitrile compound discussed hereinabove. From the results with the dimethylaminoacetonitrile, one would expect the nitrile groups of the dicyanopiperidine likewise to be split off from the parent molecule during chlorination, with the formation of cyanogen chloride. Surprisingly, however, nitrile groups are not split off in the chlorination of N-methyl-2,6-dicyanopiperidine, but are found in the desired final product, 2,6-dicyanotrichloropyridine, which is obtained in substantial yield.

The dicyanotrichloropyridine product of this invention is especially useful as an agricultural pesticide, as described in U.S. Pat. No. 3,325,503. It also exhibits outstanding activity as an industrial biocide in killing and/or controlling the growth of microorganisms, e.g., fungi and bacteria, on substrates such as plastics, leather, textiles, wood or paper. It is particularly effective as a biocidal agent incorporated in paint formulations prior to their application on a variety of substrates.

As an example of the high biocidal activity of the 2,6-dicyanotrichloropyridine product of the present invention, it is incorporated in plastics and tested in accordance with the method outlined in ASTM Test Procedure D1924–61T. The test specimens employed are 1-inch, circular polyvinyl chloride resin films prepared from different plastisol formulations of the resin which contain, by weight, varying concentrations of the chemical as shown in the following table.

A nutrient-salts agar specified by the ASTM procedure and having a pH of 6.4 after sterilization is poured into 6-inch Petri dishes and allowed to harden. The plastic film specimens are then positioned on the culture surface in the dishes. At least one plastic film specimen containing no chemical is included as a control. A spore suspension is prepared according to the test procedure and then sprayed onto the culture medium and film specimens as prescribed. The inoculated samples are incubated at 30° C. and at 85 percent relative humidity for 21 days. They are then examined and rated from 0 to 4, 0=no observed growth and 4=heavy growth (60% and above). The area around the film specimens is also examined for inhibition of microbial growth. Given in the following table in millimeters (mm.), this area is designated as Z, the higher numbers indicating larger areas of inhibtion of microbial growth.

| Percent concentration of chemical | Growth | Z, mm. |
|---|---|---|
| 0.75 | 0 | 12 |
| 0.50 | 0 | 7 |
| 0.25 | 0 | 2 |
| 0.10 | 0 | 0 |
| Control films | 4 | 0 |

In order that those skilled in the art may more completely understand the present invention and the preferred methods by which the same may be carried into effect, the following specific examples are offered. In these examples, and elsewhere herein, where proportions of ingredients may be expressed in parts, such proportions are by weight. Also, the following examples, while illustrating many of the preferred embodiments of this invention, are intended as exemplifications only and the interpretation of the claims is not to be limited thereby.

Example 1

A 2,6-dicyanopiperidine compound employed herein as an intermediate in the process of this invention is prepared according to the general method set forth in U.S. Pat. No. 3,147,267, as follows:

Into a five-gallon, stainless steel autoclave are charged successively with agitation 20.2 lbs. of a 25% aqueous solution of glutaraldehyde, 3 lbs. of deionized water and 23.3 ml. of pyridine as catalyst. The autoclave is then sealed and swept with nitrogen for about 15 minutes.

While agitation of the mixture is continued, 2.92 lbs. of HCN is added to the autoclave slowly at a prescribed rate to maintain the temperature of the reaction mixture at 30° C. maximum. All of the HCN is added in 15 minutes, after which the reaction is maintained at 30° C. for 30 minutes.

There is then added to the agitated reaction mixture, 770 ml. of 95% ethyl alcohol, followed immediately by 1.88 lbs. of methylamine, sparged in at a rate slow enough to maintain the temperature of the reaction mixture below 40° C. After addition of the amine, the reaction is continued for 90 minutes at 40°–45° C. The excess HCN is then stripped from the reaction mixture by $N_2$ purging. The product, N-methyl - 2,6-dicyanopiperidine, is recovered in 77.5% yield. It is a white solid, melting at 130°–132° C.

Example 2

(A) Photochlorination.—A 5-liter, three-necked, round bottom flask is equipped with an agitator, thermometer, sparger and reflux condenser. Charged to the flask are 596 g. (4.0 M) of N-methyl-2,6-dicyanopiperidine (product of Example 1) and three liters of chloroform. The resulting solution is agitated as chlorine gas is introduced through the sparger. Mercury vapor lamps positioned next to the flask are turned on and chlorine addition is continued for 67 hours while the temperature of the reaction mixture is maintained at 50°–60° C. The solvent is removed by distillation, finally at 5 mm. of Hg pressure, to give 1175 g. of residue.

(B) Pressure chlorination—A 2.8-liter, nickel-lined autoclave is charged with 1153 g. of this residue and 115 g. of carbon. The autoclave is sealed, purged and charged with chlorine. It is then heated to 195° C. in a three hour time period and thereafter maintained at this temperature for an additional three hours while chlorine is charged intermittently to maintain a gauge pressure of 180–200 p.s.i.g. The reactor is then discharged and rinsed with chloroform. Vapor phase chromatography (VPC) of the 911 g. of solids obtained indicates that 53% of this material is the desired 2,6 - dicyanotrichloropyridine. The overall yield of product is 52%.

Example 3

This example illustrates the preparation of 2,6-dicyanotrichloropyridine from the hydrochloride salt derivative of the 2,6-dicyanopiperidine intermediate compound.

(A) Photochlorination.—A 1-liter, three-necked, round bottom flask is equipped with an agitator, thermometer, sparger and reflux condenser and is positioned in a cooling bath. Charged to the flask with agitation is 560 ml. of chloroform. While agitation is continued, 75 g. (0.50 M) of N-methyl-2,6-dicyanopiperidine is added and dissolves in the chloroform. While maintaining the resulting solution at 15°–20° C., HCl gas is then passed through until excess HCl is observed escaping from the top of the condenser (in about 35 minutes time from the start of HCl addition). Two 400-watt mercury vapor lamps positioned next to the flask are turned on and $Cl_2$ addition is started. During chlorination (14 hours), the temperature of the reaction mixture is gradually raised to 38° C. The reaction mixture is then filtered.

(B) Vapor phase chlorination.—A 240 g. portion of the filtrate which contains the equivalent of 20 g. of the starting N-methyl-2,6-dicyanopiperidine is heated to 40° C. and air-blown over the surface to remove the solvent. A viscous yellow oil weighing 72 g. is recovered and placed in a dropping funnel connected via a T-adapter to a 0.75 inch Ni U-tube which is 13.5 inches tall. The exit end of the U-tube is connected via a heated glass tube to a collection flask fitted with a reflux condenser and containing refluxing chloroform. The U-tube contains 100 ml. of Harshaw Ba 0108 E 4–6 carbon and is heated in a molten salt bath to 340°–350° C. during the reaction. Chlorine is fed through the T-adapter at a rate of 1 mol/hour while the product of the photochlorination is added dropwise at a uniform rate over a period of 2 hours. After addition is complete, the solvent in the collection flask is evaporated and the solid product resulting is ground, washed sparingly with $CCl_4$ and air-dried. VPC analysis indicates that the product is 2,6-dicyanotrichloropyridine of 93.2 percent purity. The overall yield of this product (26 g.) is 77%.

Example 4

Following the same general procedure as outlined in Part B of Example 3 above, another 240 g. portion of the filtrate obtained from the initial photochlorination reaction is chlorinated in the vapor phase. In this example, the U-tube reactor contains 50 ml. of coconut charcoal, 6–14 mesh, as catalyst. The dropwise addition of the oily reactant is completed in about 90 minutes. Evaporation of the solvent and work-up of the crude product residue yields 2,6-dicyanotrichloropyridine of 85% purity in 69% of theoretical yield.

Example 5

Into a 500-ml. flask equipped with a magnetic stirrer, condenser thermometer, cooling bath and chlorine inlet tube are charged 22.3 parts (0.15 M) of N-methyl-2,6-dicyanopiperidine and 240 ml. of chloroform. The agitated mixture is cooled to 5° C. and chlorine is added for one hour while maintaining the mixture at 5°–20° C. The mixture is then heated to reflux with ultraviolet light and the chlorination is continued for 19 hours. Vapor phase chromatographic analysis (VPC) of the reaction mixture shows it to contain 21 percent of the theoretical yield of 2,6-dicyanotrichloropyridine.

The reaction mixture is filtered and the filtrate is divided into two portions.

The first filtrate portion is added dropwise into a glass U-tube filled with Raschig rings and positioned in an oil bath maintained at 151°–153° C., while chlorine gas is bubbled through the tube. VPC analysis of the material collected in the receiver indicates that it contains 58 percent of 2,6-dicyanotrichloropyridine.

Another similar glass U-tube is packed two-thirds full with a carbon catalyst and then with Raschig rings to the top. The second portion of the filtrate from the initial photochlorination reaction is added dropwise into this tube held in an oil bath maintained at 165°–173° C., while chlorine gas is simultaneously bubbled through the tube. Extraction of the catalyst isolates a product which VPC analysis indicates to contain 68% of the desired 2,6-dicyanotrichloropyridine.

Example 6

The preparation of 2,6-dicyanotrichloropyridine from photochlorination of N-methyl-2,6-dicyanopiperidine followed by vapor phase chlorination of the reaction mixture is as follows:

A 1-liter, three-necked, round bottom flask equipped with an agitator, thermometer, sparger and reflux condenser is positioned in a cooling bath. The flask is charged with 75 g. (0.5 M) of N-methyl-2,6-dicyanopiperidine and 560 ml. of chloroform. The resulting solution is agitated and cooled to 20° C. prior to introduction of chlorine. After 1.5 hours of chlorine addition, two 400-watt mercury vapor lamps next to the flask are turned on. Chlorination is continued at 20°–30° C. for 16 hours. The reaction mixture is filtered to give 943 g. of filtrate which contains some 2,6-dicyanotrichloropyridine as evidenced by VPC.

A 126 g. portion of this filtrate (containing the equivalent of 10 g. of the starting N-methyl-2,6-dicyanopiperidine) is added dropwise to the apparatus described in Part B of Example 3. In this example, the U-tube contains 25 ml. of the Harshaw Ba 0108 E 4–6 carbon catalyst, the salt bath temperature is 300° C. and the reaction time is 1.5 hours. The yield of 2,6-dicyanotrichloropyridine is 54%.

It is to be understood that although the invention has been described with specific reference to particular embodiments thereof, it is not to be so limited, since changes and alterations therein may be made which are within the full intended scope of this invention as defined by the appended claims.

I claim:
1. A process for preparing 2,6-dicyanotrichloropyridine which consists essentially of
(A) reacting a 2,6-dicyanopiperidine compound having the structural formula

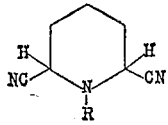

wherein R is H or $C_{1-5}$ alkyl, with chlorine at a temperature of 20°–80° C. with the aid of ultraviolet radiation for a sufficient period of time to effect substantial dehydrogenation of said dicyanopiperidine compound concurrent with aromatization and perchlorination of at least a portion thereof; and
(B) further reacting the resulting partly chlorinated product mass with chlorine at a temperature of 150°–500° C. for a sufficient period of time to obtain 2,6-dicyanotrichloropyridine.

2. The process of claim 1 wherein 2,6-dicyanotrichloropyridine is recovered in at least 50 percent yield.

3. The process of claim 1 wherein the 2,6-dicyanopiperidine compound is N-methyl-2,6-dicyanopiperidine.

4. The process of claim 1 wherein the 2,6-dicyanopiperidine is employed in the form of its hydrochloride salt.

5. The process of claim 1 wherein the 2,6-dicyanopiperidine compound is employed as a solution in an organic liquid selected from the group consisting of chloroform, carbon tetrachloride, trichlorobenzene and tetrachloroethane.

6. The process of claim 5 wherein the solvent is chloroform.

7. The process of claim 1 wherein the partly chlorinated product mass resulting from the photochlorination is reacted with chlorine in the vapor phase at a temperature of 200°–500° C. in the presence of a catalyst selected from the group consisting of alumina, silica, natural clays, iron hydroxide and activated carbon.

8. The process of claim 7 wherein the catalyst employed is an activated carbon which is modified by barium chloride.

9. The process of claim 7 wherein the 2,6-dicyanotrichloropyridine is obtained in at least 65 percent yield.

References Cited

UNITED STATES PATENTS

| | | | |
|---|---|---|---|
| 3,147,267 | 9/1964 | Rogers | 260—293 |
| 3,325,503 | 6/1967 | Bimber | 260—294.9 |

ALAN L. ROTMAN, Primary Examiner

U.S. Cl. X.R.

71—94; 424—263; 204—158 HA